(12) United States Patent
Dai et al.

(10) Patent No.: US 11,798,460 B2
(45) Date of Patent: Oct. 24, 2023

(54) ELECTRONIC DEVICES WITH DISPLAY AGING COMPENSATION

(71) Applicant: Apple Inc., Cupertino, CA (US)

(72) Inventors: Zhuoran Dai, Santa Clara, CA (US); Shen Ren, Cupertino, CA (US); Christopher M. Dodson, Santa Clara, CA (US); Kenneth J. Vampola, Los Altos, CA (US); Mahdi Nezamabadi, San Jose, CA (US); Ates C. Dumlupinar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 519 days.

(21) Appl. No.: 16/535,734

(22) Filed: Aug. 8, 2019

(65) Prior Publication Data

US 2021/0043130 A1    Feb. 11, 2021

(51) Int. Cl.
*G09G 3/32* (2016.01)
*G01J 1/42* (2006.01)

(52) U.S. Cl.
CPC .............. *G09G 3/32* (2013.01); *G01J 1/4204* (2013.01); *G09G 2320/045* (2013.01); *G09G 2320/0626* (2013.01); *G09G 2320/0666* (2013.01); *G09G 2330/10* (2013.01); *G09G 2354/00* (2013.01); *G09G 2360/141* (2013.01); *G09G 2360/144* (2013.01); *G09G 2360/145* (2013.01)

(58) Field of Classification Search
CPC ............... G09G 3/32; G09G 2360/141; G09G 2360/144; G09G 2320/045; G09G 2320/0666; G09G 2330/10; G09G 2320/0626; G09G 2360/145; G09G 2354/00; G01J 1/4204
See application file for complete search history.

(56) References Cited

U.S. PATENT DOCUMENTS

| 7,145,572 | B2 | 12/2006 | Dresevic et al. |
| 8,582,034 | B2 | 11/2013 | Kwong |
| 9,058,769 | B2 | 6/2015 | Bert et al. |
| 9,530,381 | B1 * | 12/2016 | Bozarth .............. G09G 3/3406 |
| 9,626,024 | B1 | 4/2017 | Tan et al. |
| 10,241,624 | B2 | 3/2019 | Booth et al. |
| 2006/0181552 | A1 | 8/2006 | Hopple |
| 2010/0201275 | A1 * | 8/2010 | Cok ....................... G06F 3/042 |
| | | | 315/158 |

(Continued)

*Primary Examiner* — Lunyi Lao
*Assistant Examiner* — Jarurat Suteerawongsa
(74) *Attorney, Agent, or Firm* — Treyz Law Group, P.C.; G. Victor Treyz; Tianyi He

(57) ABSTRACT

An electronic device may have a display. The display may have light-emitting diode pixels or other pixels. Due to aging-induced degradation of the pixels, the output intensity and color of the pixels may vary over the lifetime of the display. Control circuitry in the device may use an ambient light sensor to measure ambient light and stray display light. The display light measurements may be used in monitoring aging effects so that the control circuitry can compensate for aging-induced pixel degradation. Display light measurements may be made over a sequence of image frames. The image frames in the sequence of frames may include white and black frames or frames of different colors interleaved with black frames. Different frame intensities may be used during measurements of stray display light to gather gamma curves for the display.

22 Claims, 5 Drawing Sheets

(56) References Cited

U.S. PATENT DOCUMENTS

| | | | |
|---|---|---|---|
| 2015/0070402 A1* | 3/2015 | Shah | G09G 3/20 345/690 |
| 2016/0042676 A1* | 2/2016 | Berkeley | G09G 3/006 345/589 |
| 2017/0076661 A1* | 3/2017 | Zhang | G09G 3/2003 |
| 2017/0188023 A1* | 6/2017 | Brabenac | H04N 17/02 |
| 2018/0089861 A1* | 3/2018 | Klement | G09G 3/2003 |
| 2018/0247588 A1* | 8/2018 | Lee | G09G 3/3225 |
| 2018/0360330 A1* | 12/2018 | Pearce | A61B 5/0077 |
| 2019/0191153 A1 | 6/2019 | Speigle et al. | |

* cited by examiner

ELECTRONIC DEVICES WITH DISPLAY AGING COMPENSATION

FIELD

This relates generally to electronic devices, and, more particularly, to electronic devices with displays.

BACKGROUND

Electronic devices may have displays for displaying content to a user. If care is not taken, aging effects may cause the performance of a display to vary as a function of time. For example, in a color display, wear on the colored pixels of the display may cause undesired aging-induced color shifts over time. Factors such as operating temperature, ambient light exposure, display operating brightness, and display operating duration can contribute to changes in display characteristics. It can therefore be challenging to accurately predict changes to the characteristics of a display over time.

SUMMARY

An electronic device may have a display. The display may have light-emitting diode pixels or other pixels. Due to aging-induced degradation of the pixels, the output intensity and color of the pixels may vary over the lifetime of the display.

To measure display aging effects, a light sensor may be used to periodically measure display light that is emitted by the display. In an illustrative configuration, the light sensor may be an ambient light sensor that picks up ambient light and stray display light.

During operation, control circuitry in the device may use an ambient light sensor to make light measurements. Display pixels may be modulated to help the control circuitry discriminate between ambient light contributions and display light contributions to the readings of the light sensor.

Display light measurements may be used in monitoring aging effects so that the control circuitry can compensate for aging-induced pixel degradation. Display light measurements may be made while the control circuitry is using the display to display a predetermined sequence of image frames. These image frames may be displayed just before or after use of the display in displaying content for a user (e.g., text, graphics, etc.) or at other times outside of the normal operating periods where user content is being displayed. The image frames in the sequence of frames may include white and black frames or frames of different colors interleaved with black frames. Different frame intensities may be used during measurements of display light to gather gamma curves for the display. If desired, display light measurements may also be made while displaying content for a user.

DETAILED DESCRIPTION

Figure 1:
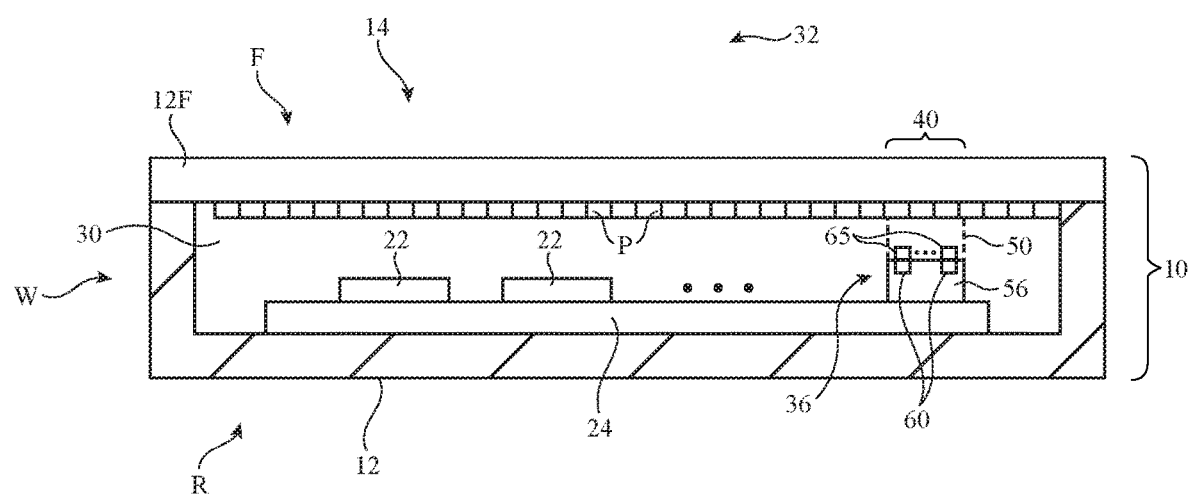
FIG. 1 is a cross-sectional side view of an illustrative electronic device with a display in accordance with an embodiment.

An electronic device may have a display. The display may have an array of pixels for displaying images. The pixels may be liquid crystal display pixels, organic light-emitting diode pixels, pixels formed from crystalline semiconductor light-emitting diodes, or other display pixels. Pixels may experience aging effects. For example, pixel components that are used in the pixels to provide the display with the ability to display color images such as colored organic materials (e.g., for color filter elements, colored emissive material in diodes, etc.) may wear over time.

To prevent undesired variations in display performance, control circuitry in the electronic device can make measurements of display performance and can compensate the display for any detected changes due to aging. In particular, a light detector may be used to measure display output and these measurements may be used to evaluate display performance. Running averages or other information tracking display performance may be maintained over the lifetime of the display (e.g., information on the amount of measured light output for different colors of pixels as a function of digital image data value and/or other display performance information may be stored in the control circuitry). If changes in output intensity and/or color are detected, the control circuitry can compensate for the changes and thereby ensure that display output characteristics (e.g., luminance and color) will remain consistent over time.

The light detector that is used in monitoring display performance may be a monochrome light sensor or may be a color light sensor that can detect light intensity and light color. In an illustrative configuration, the light detector that is used in monitoring the display is an ambient light sensor (e.g., a sensor that is sometimes used in monitoring the color and intensity of ambient light in the environment surrounding the electronic device). During display characterization operations, color and/or intensity measurements may be made on display light (and any ambient light that is present) using the ambient light sensor. The display light component of the measured light can be extracted from background ambient light signals by modulating the display light intensity during sensor measurements.

During normal operation, display light contributions to the ambient light sensor output can be ignored and/or removed to produce ambient light measurements. These ambient light measurements may be used in dynamically adjusting the intensity and color of images on the display. For example, in dim lighting conditions display output intensity may be reduced to help conserve power, whereas in bright lighting conditions display output intensity may be increased to ensure that content on the display is visible to a user. Color adjustments (e.g., white point adjustments) may also be made dynamically to ensure that the white point of displayed content tracks ambient lighting conditions. For example, in cold lighting conditions, the white point of the content on a display may be adjusted to be cooler. When warm lighting conditions are detected, the white point of the display may be warmed accordingly. Display intensity and color adjustments made based on ambient lighting conditions can be made over a relatively short time period (e.g., over seconds or fractions of a second), whereas display calibration adjustments that adjust display intensity and color to compensate for aging-induced wear can be made in a separate control loop over a much longer period of time (e.g., days, weeks, months, or more).

A cross-sectional side view of an illustrative electronic device with a display and an ambient light sensor is shown in FIG. 1. Electronic device 10 may have a display such as display 14 mounted in a housing such as housing 12. Device 10 of FIG. 1 is a portable device such as a cellular telephone, wristwatch device, or tablet computer. Other types of electronic devices may be provided with ambient light sensors if desired. Electronic device 10 may be, for example, a computing device such as a laptop computer, a media player, a pendant device, a display, a gaming device, a head-mounted device, a desktop computer with an integrated display, an embedded system such as a system mounted in a kiosk or automobile, or other electronic equipment.

Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose an interior region such as interior region 30 within device 10 and may separate interior region 30 from an exterior region such as exterior region 32 surrounding device 10. The housing walls may include a rear wall on rear side R of device 10, sidewalls on edges W of device 10, and a transparent housing wall that serves as a display cover layer on front side F of device 10. Front side F opposes rear side R of device 10 in the illustrative configuration of FIG. 1. Other arrangements may be used for forming housing 12 in device 10, if desired.

Display 14 may have an array of pixels P for displaying images for a user. Display 14 may be a liquid crystal display, an organic light-emitting diode display, a display having an array of light-emitting diode pixels formed from crystalline semiconductor dies, or other suitable display. The pixels of display 14 may be colored pixels that contain colored materials (e.g., colored organic materials) to allow display 14 to display color images. The portion of housing 12 that overlaps display 14 may sometimes be referred to as a display cover layer. The display cover layer (e.g., display cover layer 12F in the example of FIG. 1) may be formed from glass, crystalline material such as sapphire, clear polymer, other transparent materials, and/or combinations of these materials. The display cover layer may be coupled to metal housing walls or other housing structures in housing 12 and may sometimes be referred to as forming transparent housing structures or a transparent housing wall.

Display cover layer 12F may overlap pixels P of display 14 on front side F of device 10. During operation, pixels P may display an image for viewing by a user of device 10. In some configurations, one or more portions of display cover layer 12F may also overlap inactive display areas that contain display driver circuitry and other components, but that do not include pixels and do not display images. An inactive display area may, as an example, form a notch or an isolated island surrounded by pixels P at one end of device 10. If desired, inactive areas can be minimized so that display 14 is borderless or nearly borderless.

As shown in FIG. 1, electrical components 22 may be mounted in interior 30 of device 10 (e.g., on a substrate such as printed circuit 24 located between display cover layer 12F on front side F and an opposing rear housing wall on rear side R). Components 22 may include integrated circuits, discrete components, light-emitting components, sensors, and/or other circuits. If desired, the electrical components in device 10 may include an ambient light sensor such as ambient light sensor 36. Ambient light sensor 36 may make ambient light measurements on ambient light received through region 40 of display cover layer 12F and display 14. In some configurations, ambient light may be received through transparent portions of pixels P in region 40. In other configurations, a pixel-free opening for an ambient light sensor window may be formed in display 14 in region 40. This window may be a pixel-free area in the pixel array that is fully or partially surrounded by pixels P. Arrangements in which ambient light sensor 36 is located in an inactive display region or other portion of device 10 may also be used.

In the example of FIG. 1, ambient light sensor 36 is mounted under region 40 of pixels P in the active area of display 14 and is configured to receive ambient light through gaps between the opaque structures in pixels P or through an ambient light sensor window. As shown in FIG. 1, an optional light guide such as light guide 50 may, if desired, be used to guide light to ambient light sensor 36. This guided light or other light received by ambient light sensor 36 may contain both an ambient light component (ambient light from exterior 32) and a display light component (stray display light emitted by pixels P).

Electrical components 22 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output, to transmit signals to external equipment, to adjust display 14 (e.g., to adjust display brightness and/or color to control the brightness and/or color of images on display 14 in response to measurements from a color ambient light sensor such as ambient light color and/or ambient light intensity), and/or to perform other tasks. Display aging effects can be characterized using measurements from ambient light sensor 36 and/or other sensors and can be compensated by the processing circuitry.

The processing circuitry may be based on one or more microprocessors, microcontrollers, digital signal processors, baseband processors, power management units, audio chips, application specific integrated circuits, display timing controller integrated circuits, etc. The control circuitry may include wired and/or wireless communications circuitry (e.g., antennas and associated radio-frequency transceiver circuitry such as cellular telephone communications circuitry, wireless local area network communications circuitry, etc.).

The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices.

Wireless communications circuitry may, for example, wirelessly transmit control signals and other information to external equipment in response to receiving user input or other input from sensors or other devices in components 22.

Input-output circuitry in components 22 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 22) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors such as ambient light sensor 36, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 22 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 22 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.). For example, the control circuitry of device 10 may gather information on ambient light color and ambient light intensity using an ambient light sensor and may gather information on display pixel color and intensity. The ambient light information may be used in making dynamic adjustments to the brightness and color (e.g., the white point) of display 14. Display characterization measurements made with the ambient light sensor may be used by the control circuitry in determining how much display 14 has aged, so that the control circuitry can compensate for aging effects when displaying content on display 14.

If desired, electronic device 10 may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

As shown in FIG. 1, ambient light sensor 36 may be formed from a semiconductor die such as die 56 (e.g., a silicon die). Die 56 may be mounted on a substrate such as a printed circuit substrate. Ambient light sensor 36 may, as an example, be mounted on a printed circuit that is mounted to printed circuit 24 or may be mounted directly to printed circuit 24. Signal lines in one or more printed circuits or other signal lines may interconnect ambient light sensor die 56 with the control circuitry in device 10.

Ambient light sensor 36 may be a monochrome ambient light sensor or a color ambient light sensor. A monochrome ambient light sensor may have a single photodetector. A color ambient light sensor has multiple photodetectors for detecting light in different wavelength bands.

In the illustrative configuration of FIG. 1, ambient light sensor 36 is a color ambient light sensor having multiple photodetectors 60 formed in semiconductor die 56. Each photodetector 60 has a corresponding color filter 65 through which light passes before reaching that photodetector. Color filters 65 may be formed from colored polymer layers or other materials that pass particular bands of wavelengths (e.g., different colors of light) and/or may be formed from thin-film interference filters with different pass bands. As an example, color filters 65 may include a first color filter that passes red light, a second color filter that passes blue light, and additional color filters that pass light of different colors. With this type of arrangement, different photodetectors 60 detect light of different colors. A multichannel light sensor such as sensor 36 of FIG. 1 may therefore measure the relative contribution of each color of light that is present and may therefore serve as a color ambient light sensor that measures both the total light intensity of ambient light and ambient light color. Ambient light color measurements may be gathered as color coordinates, a color temperature, a correlated color temperature, a light spectrum, or as color measurement data represented using other color measurement formats. There may be, for example, at least 3, at least 6, at least 10, fewer than 20, fewer than 9, or other suitable number of color channels in ambient light sensor 36 and at least 3, at least 6, at least 10, fewer than 20, fewer than 9, or other suitable number of photodetectors 60 on die 56.

Ambient light sensor 36 may be mounted in alignment with region 40 and optional light guide 50. In this way, ambient light sensor 36 may gather measurements on the intensity and color of ambient light in exterior region 32. When display 14 is off, no display light is emitted by pixels P. When display 14 is active, however, some of the light emitted by pixels P will be measured by ambient light sensor 36. In a mixed environment in which both ambient light and display light are present, ambient light sensor 36 can measure both ambient light and display light simultaneously. Control circuitry in device 10 can discriminate between the ambient light and display light contributions using display light modulation techniques.

By using sensor 36 to measure the amount of display light from display 14 under various different operating conditions, control circuitry can measure aging effects. Characterizing measurements such as these may be made periodically so that the control circuitry of device 10 can compensate for aging effects and thereby ensure that the output of display 14 does not experience aging-induced color shifts or degradations in output light intensity.

Figure 2:
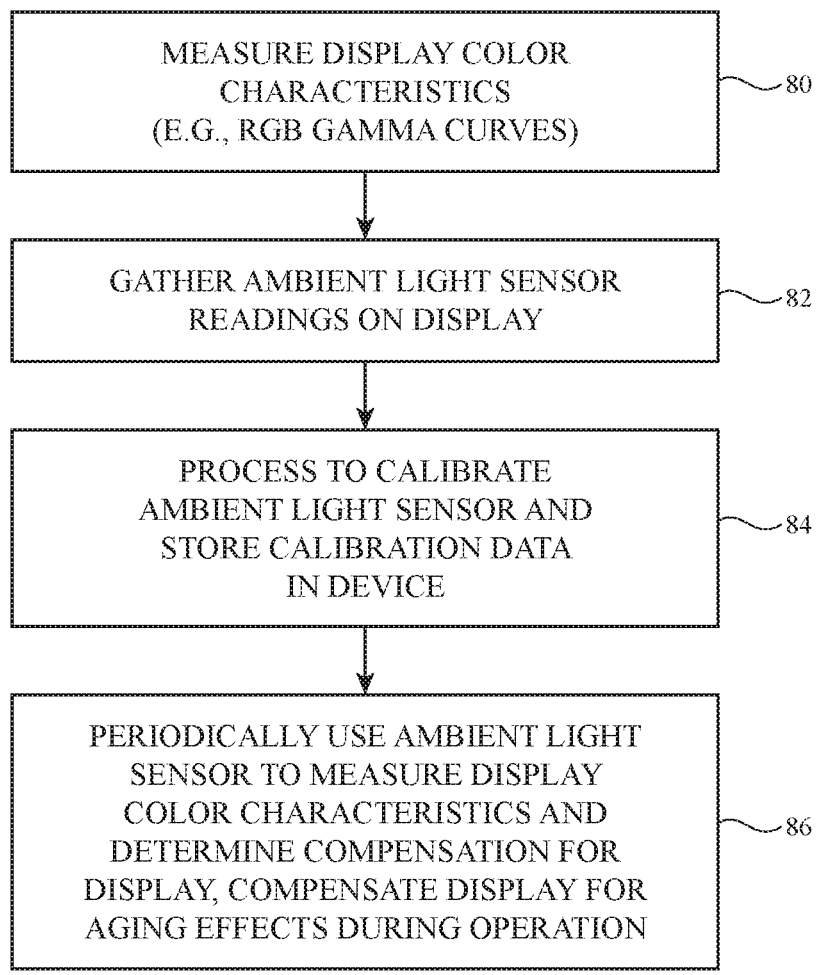
FIG. 2 is a flow chart of illustrative operations involved in operating an electronic display and a light sensor that can measure ambient light and display light in accordance with an embodiment.

Illustrative operations associated with operating device 10 are shown in FIG. 2. During manufacturing operations, display 14 may be characterized. For example, during the operations of block 80, while display 14 is in a dark environment such as a light-sealed test enclosure, color measurement test equipment may be used to measure the output of display 14. The output of each color of pixel in display 14 (e.g., red pixels, green pixels, and blue pixels) can be characterized separately and at multiple output levels. In this way, curves of output intensity as a function of digital value (e.g., 0-255) can be determined for each color of display 14. These curves, which may sometimes be referred to as gamma curves, may be used to determine the color characteristics of the display. Due to manufacturing variations, the color of a given display (the display's white point) may vary slightly from a desired color. Manufacturing variations such as these may be corrected by storing calibration data (sometimes referred to as display compensation settings) in storage in device 10. During subsequent operations, the control circuitry of device 10 can use the calibration data from the initial test measurements (in addition to any aging information obtained later) to adjust the display. Real-time adjustments (e.g., color and intensity adjustments made dynamically over a time period of seconds based on ambient light measurements) can be made in addition to any longer-term underlying calibration adjustments to compensate for manufacturing variations and aging.

Ambient light sensors may be subject to manufacturing variations. During the calibration operations of block 82, the sensitivity of ambient light sensor 36 in each of its color channels may therefore be measured using test equipment. During calibration operations, test ambient light of known color and intensity can be applied to device 10 to determine the sensitivity of ambient light sensor 36 to ambient light across its operating wavelengths (e.g., the visible light spectrum). When outputting light from display 14 to display an image, stray light from display 14 reaches ambient light sensor 36. The operations of block 82 may therefore also involve calibrating the response of ambient light sensor 36 to each of the colors of pixels in display 14 as display 14 outputs light. For example, after measuring the gamma curves of the red, green, and blue pixels of display 14 with reference equipment during the operations of block 80, the operations of block 82 may be used to determine the response of ambient light sensor 36 to stray light produced during known display operating conditions. In particular, the amount of optical coupling between display 14 and sensor 36 (e.g., the fraction of emitted light of each color from display 14 that is received by sensor 36) can be determined during the operations of block 84, and the performance of ambient light sensor 36 in measuring each emitted display color can be assessed under a range of light intensities.

During the calibration operations of block 82, the response of sensors 36 to different amounts of ambient light and the response to sensors 36 to different amount of display light can therefore be determined and this ambient light sensor calibration data can be stored in the control circuitry of device 10 and used during subsequent measurements of ambient light and display light. The gamma curves for display 14 that were measured during the operations of block 80 and the calibration data for ambient light sensor 36 determined during block 84 can be stored in storage in device 10 (e.g., in control circuitry in device 10).

At a later time, after device 10 has been shipped to a user, device 10 can be used by a user (block 86). During use, display 14 may sometimes be turned off and may sometimes be turned on to display images for viewing by the user (e.g., images containing text, graphics, or other user content). The images that are displayed may be presented to the user in a variety of lighting conditions. Periodically, ambient light sensor 36 may make light measurements. Some of the light measurements may be used to gauge ambient lighting levels and ambient lighting color. Ambient light intensity measurements may be used, for example, to determine whether lighting conditions are bright or dim. Display brightness can then be adjusted upwards or downwards accordingly. Measurements of ambient light color can be used to adjust the color of display 14 (e.g., to adjust the white point of display 14 to a colder tone when ambient lighting conditions are cold, etc.). In some operating scenarios, ambient light measurements with sensor 36 may be made relatively frequently (e.g., once per second) to allow display brightness to track fluctuations in ambient lighting (e.g., as a user moves between a shaded location to a bright unshaded location, etc.).

In addition to using ambient light measurements from sensor 36 to dynamically adjust the overall brightness and color (white point) of display 14 and thereby ensure that contents is displayed satisfactorily for the current ambient lighting environment, periodic light measurements may be made with sensor 36 to asses display pixel aging effects. These measurements evaluate the output of display 14. Display light measurements can be made with sensor 36 by cycling the pixels of display 14 on and off or otherwise modulating display light intensity (and/or color) so that the contributions to the readings made with ambient light sensor 36 from display light can be separated from the contributions to the reading made with ambient light sensor from ambient light.

In dark conditions, ambient light levels may be low. In bright conditions, however, ambient light levels may exceed the amount of display light that is received at ambient light sensor 36. By modulating the display light (e.g., by turning display light on and off between successive frames and/or by otherwise adjusting between different display light intensities and/or colors), the control circuitry in device 10 can discriminate between the output of display 14 and ambient light. This allows display pixel output to be measured and allows aging effects to be monitored, so that the control circuitry can compensate for aging when using display 14. For example, if it is determined that the output of red pixels has dropped by 1% over time, the control circuitry can update the display calibration data for the red display pixels to boost the red pixel values by 1% to compensate. Calibration adjustments such as these may be made for each color of pixel in display 14 and can be made for each of multiple output levels.

Color and/or intensity display light measurements with sensor 36 to assess aging may be made at any suitable time. Aging effects tend to occur slowly (e.g., over days, months, or years), so power consumption can be enhanced by performing aging assessment measurements less frequently than the ambient light measurements being made for controlling display intensity and color in response to ambient light fluctuations. For example, sensor measurements of display light intensity and color may be made once per hour, once per day, once per month or other suitable time period. In general, measurements of display output light may be made each time (or once per every N times) that display 14 is turned on or off, may be made at a predetermined time of day (e.g. at night whenever device 10 is being used after 10 PM), may be made when device 10 is stationary for more than a predetermined amount of time (e.g., for more than 30 minutes indicating that the user is not actively viewing display 14), may be made in response to user commands (e.g., when the user directs device 10 to initiate a display calibration routine), may be made when the time from the last measurement exceeds a threshold amount of time such as one day, one week, or other predetermined threshold period, and/or may be made in response to determining that any other suitable display output characterization criteria have been satisfied. Aging-compensation calibration data to compensate display 14 for aging degradation can be updated once per month, once every 60 days, once per day, and/or when other suitable update criteria are satisfied. Aging compensation settings may be updated each time an aging-effect measurement is made or may be made less frequently. For example, aging measurements with sensor 36 may be made once per week and the aging compensation settings for display 14 that are produced from these aging measurements may be made once per month (as an example).

To ensure that the display light data that is gathered by the control circuitry of device 10 using ambient light sensor 36 is not overly noisy, measurements made when ambient light sensor readings are high (e.g., more than a predetermined threshold) can be discarded or such measurements may not be made whenever it is known that ambient light levels are high. Device 10 may, as an example, wait until device 10 is located in a dark environment (ambient light level less than a predetermined threshold amount) before taking display brightness measurements. Display light measurements that are noisy (e.g., display brightness or color readings that vary from adjacent measurements or well-established long-term averages by more than a threshold amount) may also be discarded. In general, any suitable signal processing techniques may be used to help reduce data noise.

Figure 3:
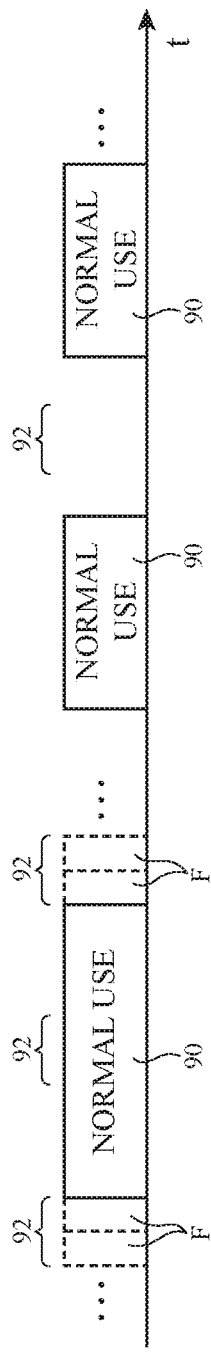
FIG. 3 is a timing diagram of illustrative operations involved in characterizing display output in accordance with an embodiment.

FIG. 3 is a timing diagram showing illustrative time periods during which aging-effect measurements can be made on the display light produced by display 14. As shown in FIG. 3, during use of device 10 by a user (e.g., during the operations of block 86 of FIG. 2), device 10 may sometimes be turned on for normal use in displaying user content such as user text and/or user graphics (periods 90). During other time periods, display 14 may generally be turned off and/or otherwise not in normal use displaying user images for a user.

To measure stray light output from display 14 with sensor 36 and thereby assess the output of display 14 to monitor for aging-induced display degradation, the control circuitry of device 10 may periodically supply known data to the pixels of display 14. As an example, display 14 may be directed to supply a sequence of white image frames of a known intensity interlaced with a sequence of black (dark) image frames in which no output light is produced. By subtracting light measurements made during the black frames from light measurements made during the white frames, sensor 36 can be used to measure display brightness during the white frames. This is because ambient light contributions to the white and dark frames will be the same and will therefore be removed by the subtraction process. Ambient light contributions can also be subtracted out by modulating frame intensity between first and second non-zero levels.

Illustrative display light measurement periods 92 are shown in FIG. 3. As shown in FIG. 3, these measurement periods may, if desire, include multiple image frames F. The frames F may include white and dark frames and/or colored frames and may vary to cover multiple known intensity levels. Measurement periods 92 may be located just before display 14 is used for normal operations 90 (e.g., for a fraction of a second before display 14 is turned on when awaking device 10 from sleep), may be located just after display 14 is used for normal operations 90 (e.g., when display 14 and device 10 are being put to sleep), or may occur at any suitable time between periods of normal use. During these time periods, which occur outside of normal usage periods 90 in which display 14 is displaying images for viewing, display 14 is not needed for displaying content for a user and can therefore be used to display image frames that are used primarily or only for assisting with the process of measuring display light. These images may include, for example, frames of a solid color over some or all of the surface of display 14 (e.g., full frames of non-dark pixels that cover all of display 14 or partial frames of non-dark pixels that cover only a subset of the area of display 14 while remaining pixels are dark and that overlap and/or that do not overlap the ambient light sensor), white frames, black frames, etc. Partial frames may include dark pixels in all but one or more sub-areas of interest. A subarea of non-dark pixels may be formed from a block of non-dark pixels that consume less than the full display area, may be one or more rows of non-dark pixels, may be a single non-dark pixel of interest, or may include other suitable patterns of non-dark pixels (e.g., white pixels or pixels of a particular color and/or intensity). By sequentially scanning through multiple different non-dark pixel areas over multiple respective frames (e.g., by row, by block, by single pixel, etc.), localized aging characteristics for the display can be measured. Device 10 can then compensate for display aging on a pixel-by-pixel basis, a row-by-by-row basis, a block-by-block basis, etc. The total duration of the measurement periods during which sequences of known images frames are displayed may be relatively small (e.g., less than 500 ms, less than 250 ms, less than 100 ms, less than 50 ms, or other suitable time period). Accordingly, display light measurements may, if desired, be so brief that they are not noticeable to a user. To ensure accurate measurements, numerous measurements may be made (e.g., over the life of device 10) and results continually updated using weighted running averages.

In some embodiments, part of an image frame that overlaps sensor 36 may be turned on and off in sequence to support display brightness measurements without turning on and off the rest of the image frame. As an example, a logo that covers a portion of display 14 or other image content that covers some but not all of display 14 may be turned on and off in a portion of a display that overlaps sensor 36. When a logo is used, the fact that the light associated with the logo is being used to make display brightness measurements will not be readily apparent to the user, even if the measurements extend for a relatively long duration (e.g., several seconds), so that the user is not inconvenienced or confused by the display brightness measurements. In general, the frames of image content that are displayed during ambient light sensor measurements of display light may include full frames that cover all of display 14, partial frames that cover a subset (less than all) of the surface of display 14 (e.g., dark frames that contain rows, blocks, or other patterns of pixels that are active so that localized aging measurements may be made), frames with white content, dark content, colored content, or other suitable content.

During normal usage periods 90, the content that is being displayed for the user may pass through a frame buffer or other storage in the control circuitry of device 10. Because the values of the pixels that overlap sensor 36 are known, the control circuitry can determine how much light should be measured by sensor 36. In this way, the knowledge of the state of the pixels of display 14 by the control circuitry can be used to allow display brightness measurements to be made during one or more of normal use periods 90. During normal use, photographs, images containing text, moving image content, and/or other content can be displayed in one or more normal image frames. These frames may contain content at various intensity levels. These frames may also contain dark content that covers some or all of display 14 and/or that overlaps sensor 36. For example, normal image content may include some frames that are entirely black or that contain frames with a subarea that is completely black.

Figure 4:
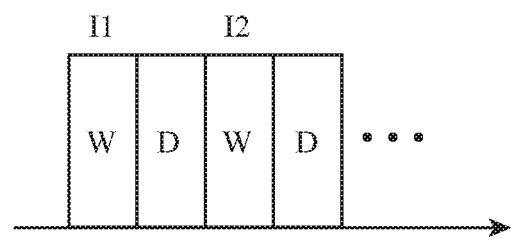
FIGS. 4 and 5 are timing diagrams showing illustrative arrangements for measuring display output with a light sensor in accordance with an embodiment.

Any suitable pattern of known pixel values may be used in measuring display brightness. With one illustrative configuration, which is shown in the timing diagram of FIG. 4, sensor 36 makes color and/or intensity measurements as a sequence of frames is presented such as white frames W (where red, green, and blue pixels are illuminated) interleaved with (e.g., alternated with) black (dark) frames D (where no pixels are illuminated). By alternating the values of the pixels overlapping sensor 36 between white and dark, the control circuitry of device 10 can subtract out background signals due to ambient light. If desired, display gamma curve information can be gathered by varying the intensity of the white frames (e.g., between first non-zero intensity I1 and a second different non-zero intensity I2, and, if desired, additional different light intensity values). Sensor 36 can gather monochrome measurements (e.g., white light intensity measurements) and/or can gather color measurements (e.g., to assess aging-induced drift in the white point of display 14). Display calibration data to compensate for the effects of aging can then be gathered.

Figure 5:
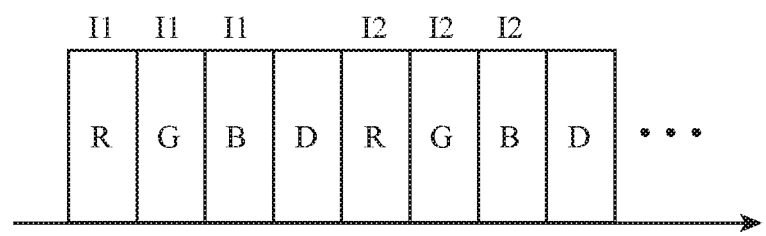

In the illustrative display brightness illumination pattern of FIG. 5, colored frames such as red frames R (frames where only red pixels are illuminated), green frames G (frames where only green pixels are illuminated), and blue frames B (frames were only blue pixels are illuminated) are interspersed with dark frames (black frames) D. A regular pattern (R, G, B, and D . . . ) may be used for the displayed image frames or other frame color patterns may be used. To obtain gamma curve information (display brightness as a function of digital pixel values) the intensities of the frames that are displayed may be varied. For example, frames may have intensity I1, different intensity I2, etc.

Although sometimes described in the contents of arrangements in which full frames of image data are displayed during sensor measurements, sensor measurements may be made when any suitable content is being displayed on display 14 (e.g., full and/or partial frames with white, black, and/or colored content at one or more intensity levels, normal image content, logos, predetermined patterns of light, solid areas of a single color, etc.).

Figure 6:
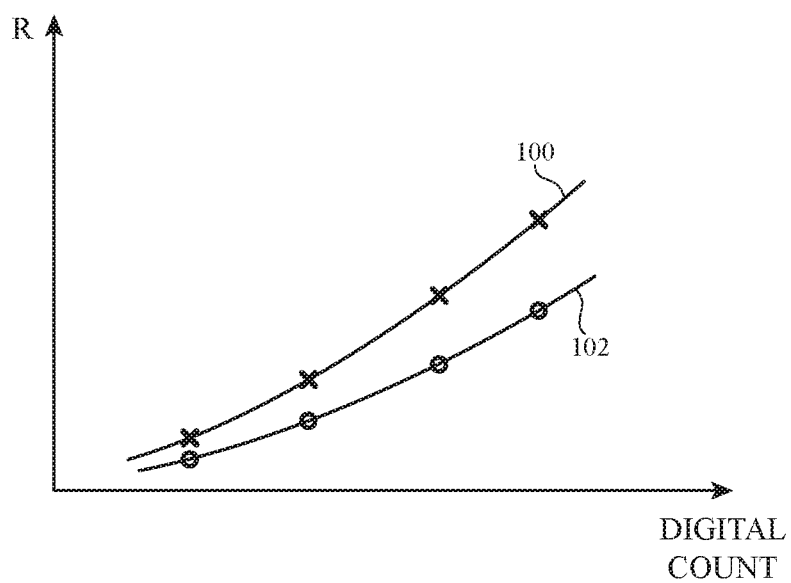
FIG. 6 is a graph containing illustrative gamma curves for an unaged display and a display characterized by aging effects in accordance with an embodiment.

A typical aging scenario is shown in FIG. 6. In the example of FIG. 6, gamma curve 100 corresponds to an unaged red-channel gamma curve obtained from factory measurements during the operations of block 80 of FIG. 2. Due to aging-induced degradation in the red pixels of display 14, the gamma curve of the red channel of display 14 following aging may appear as shown by curve 102 (e.g., with less output at each digital pixel count). Aging effects may affect gamma curve shape as well as the overall height of the gamma curve. By making display light measurements with sensor 36, the control circuitry of device 10 can measure gamma curve shapes and can compensate for these aging effects.

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:
1. An electronic device, comprising:
   a display;
   an ambient light sensor in a housing;
   control circuitry that is configured to:
      gather ambient light readings with the ambient light sensor;
      adjust a white point for images based on the ambient light readings;
      measure display light emitted from the display using the ambient light sensor; and
      display the white-point-adjusted images on the display while compensating for display aging effects using the measured display light.
2. The electronic device defined in claim 1 wherein the control circuitry is configured to turn the display on and off in sequence during the measurement of the display light.
3. The electronic device defined in claim 1 wherein the control circuitry is configured to use the ambient light sensor to measure the display light outside of time periods during which the display is displaying images for a user.
4. The electronic device defined in claim 3 wherein the control circuitry is configured to measure the display light with the ambient light sensor immediately before the display is used to display an image for the user.
5. The electronic device defined in claim 3 wherein the control circuitry is configured to measure the display light with the ambient light sensor immediately after the display is used to display an image for the user.

6. The electronic device defined in claim 1 wherein the control circuitry is configured to measure the display light with the ambient light sensor while image content is being displayed on the display and wherein the image content is selected from the group consisting of: photographs, an image with text, and a moving image.

7. The electronic device defined in claim 6 wherein the image content includes at least one black image frame.

8. The electronic device defined in claim 1 wherein the control circuitry is configured to display frames with different content including at least some partial frames with partially black content while the control circuitry measures the display light.

9. The electronic device defined in claim 8 wherein the partial frames include dark pixels and non-dark pixels, wherein the non-dark pixels in each partial frame are in a subarea, and wherein the subarea comprises a subarea selected from the group consisting of: at least one row of non-dark pixels, a block of non-dark pixels, and a single non-dark pixel.

10. The electronic device defined in claim 1 wherein the control circuitry is configured to measure the display light with the ambient light sensor during a sequence of at least two frames of light output from the display.

11. The electronic device defined in claim 10 wherein the sequence of frames includes red frames, blue frames, green frames, and black frames.

12. The electronic device defined in claim 11 wherein some of the red frames have different intensities from each other.

13. The electronic device defined in claim 10 wherein the sequence of frames includes white frames and black frames.

14. The electronic device defined in claim 13 wherein some of the white frames have different intensities from each other.

15. The electronic device defined in claim 1 further comprising a light guide that guides light to the ambient light sensor.

16. The electronic device defined in claim 1 wherein the ambient light sensor comprises a monochrome ambient light sensor.

17. The electronic device defined in claim 1 wherein the ambient light sensor comprises a color ambient light sensor having multiple photodetectors configured to detect light in different respective wavelength bands.

18. The electronic device defined in claim 1 wherein the control circuitry is configured to adjust the display to modulate the display light in intensity during the measurements.

19. The electronic device defined in claim 1 wherein the control circuitry is configured to measure the display light using the ambient light sensor according to a schedule.

20. The electronic device defined in claim 1 wherein the control circuitry is configured to measure the display light with the ambient light sensor in response to user input.

21. The electronic device defined in claim 1 wherein the control circuitry is configured to discard a measurement of the display light made with the ambient light sensor in response to determining that the measurement varies from another measurement of the display light made with the ambient light sensor by more than a threshold amount.

22. The electronic device defined in claim 1 wherein the control circuitry is configured detect an ambient light level with the ambient light sensor based on the gathered ambient light readings and is configured to discard a measurement of the display light made with the ambient light sensor in response to determining that the ambient light level is more than a threshold amount.

* * * * *